United States Patent
Ruiz

(10) Patent No.: US 10,963,305 B2
(45) Date of Patent: **\*Mar. 30, 2021**

(54) LOW LATENCY DISTRIBUTED COUNTERS FOR QUOTAS

(71) Applicant: Red Hat, Inc., Raleigh, NC (US)

(72) Inventor: Alejandro Martinez Ruiz, London (GB)

(73) Assignee: Red Hat, Inc., Raleigh, NC (US)

( \* ) Notice: Subject to any disclaimer, the term of this patent is extended or adjusted under 35 U.S.C. 154(b) by 31 days.

This patent is subject to a terminal disclaimer.

(21) Appl. No.: 16/394,886

(22) Filed: Apr. 25, 2019

(65) Prior Publication Data
US 2019/0250956 A1     Aug. 15, 2019

Related U.S. Application Data

(63) Continuation of application No. 15/656,774, filed on Jul. 21, 2017, now Pat. No. 10,275,283.

(51) Int. Cl.
*G06F 9/50*     (2006.01)
*G06F 9/54*     (2006.01)
(Continued)

(52) U.S. Cl.
CPC .......... *G06F 9/5011* (2013.01); *G06F 9/5061* (2013.01); *G06F 9/544* (2013.01);
(Continued)

(58) Field of Classification Search
CPC .................................................. G06F 9/5011
See application file for complete search history.

(56) References Cited

U.S. PATENT DOCUMENTS

| | | | |
|---|---|---|---|
| 8,131,784 B1 | 3/2012 | Zhuge et al. | |
| 8,417,817 B1 * | 4/2013 | Jacobs | H04L 69/28 709/226 |

(Continued)

OTHER PUBLICATIONS

A Tree-based Protocol for Enforcing Quotas in Clouds; Ewnetu Bayuh Lakew, Lei Xu, Francisco Hernandez-Rodriguez, Erik Elmroth, Claus Pahl; Department of Computing Science, Umea University, Sweden; 2014 (8 pages).

(Continued)

*Primary Examiner* — Charlie Sun
(74) *Attorney, Agent, or Firm* — K&L Gates LLP

(57) ABSTRACT

A system for managing access to a shared resource includes a plurality of nodes. Each of the nodes is in communication with the shared resource and has a memory and a processor in communication with the memory. The system further includes an orchestrator that has a controller and is in communication with the shared resource and the nodes. The controller is configured to determine a quota for each of the nodes, wherein each quota has a value of more than one. The processor of each of the nodes is configured to set a local counter stored in the memory of the relevant node to the value of the relevant node's quota. In response to a request received from an end device to use the shared resource, the processor of each of the nodes is further configured to serve the request and decrement the local counter by one. The processor stops serving requests when a value of the local counter reaches zero. At an end of a synchronization period, the processor sends synchronization data to the controller. The synchronization data includes the value of the local counter at the end of the synchronization period.

20 Claims, 10 Drawing Sheets

(51) Int. Cl.
*H04L 29/06* (2006.01)
*H04L 29/08* (2006.01)

(52) U.S. Cl.
CPC .......... *H04L 67/1095* (2013.01); *H04L 67/12* (2013.01); *H04L 67/42* (2013.01); *G06F 2209/504* (2013.01)

(56) References Cited

U.S. PATENT DOCUMENTS

| | | |
|---|---|---|
| 8,832,687 B2 | 9/2014 | Baron |
| 9,176,963 B2 | 11/2015 | Callahan et al. |
| 2006/0080457 A1 | 4/2006 | Hiramatsu et al. |
| 2008/0295108 A1* | 11/2008 | Ogasawara .............. G06F 9/505 718/104 |
| 2011/0055839 A1* | 3/2011 | Alexander ............ G06F 9/5066 718/102 |
| 2014/0189700 A1 | 7/2014 | Williams et al. |

OTHER PUBLICATIONS

DQMP: A Decentralized Protocol to Enforce Global Quotas in Cloud Environments; Johannes Behl, Tobias Distler, Rudiger Kapitza; published in Proceedings of the 14th International Symposium on Stabilization, Safety, and Security of Distributed Systems, 2012; (14 pages).

Rate-limiting | Apigee Product Documentation; http://docs.apigee.com/api-services/content/rate-timing; 2016, pp. 1-4.

* cited by examiner

LOW LATENCY DISTRIBUTED COUNTERS FOR QUOTAS

CROSS REFERENCES TO RELATED APPLICATIONS

The present application is a continuation of application Ser. No. 15/656,774 filed on Jul. 21, 2017, the entire content of which is hereby incorporated by reference herein.

BACKGROUND

Computing resources may be accessed and used on a shared basis by multiple end users and computing devices. A server process executing on a physical or virtual machine may, for example, be used by several network-connected clients. When a high number of end users or devices require access to a shared resource, a significant burden can be placed on the resource and on the networking and computing infrastructure that supports it. Spikes in demand can lead to server and network bottlenecks that result in service availability being restricted and, in extreme cases, entirely denied.

SUMMARY

The present disclosure provides new and innovative systems and methods for managing access to shared resources. In an example, a system includes a shared resource and a plurality of nodes. Each of the nodes is in communication with the shared resource and has a memory and a processor in communication with the memory. The system further includes an orchestrator that has a controller and is in communication with the shared resource and the nodes. The controller is configured to determine a quota for each of the nodes, where each quota has a value of more than one. The processor of each of the nodes is configured to set a local counter stored in the memory of the relevant node to the value of the relevant node's quota. In response to receiving a request from an end device to use the shared resource, the processor serves the request and decrements the relevant local counter by one. Each processor stops serving requests when a value of the local counter reaches zero. At an end of a synchronization period, the processors are configured to send synchronization data to the controller. These synchronization data include the values of the local counters at the end of the synchronization period.

In an example, a method includes determining, by an orchestrator, a quota for each of a plurality of nodes, where each quota has a value of more than one. A local counter stored in a memory of each of the nodes is set to the value of the relevant quota. In response to a request to use a shared resource made by an end device, the request is served with a first node in the nodes, where the local counter stored in the memory of the first node is more than zero. After serving the request, the local counter stored in the memory of the first node is decremented by one. At an end of a synchronization period, synchronization data is sent from each of the nodes to the orchestrator. These synchronization data include the values of the local counters at the end of the synchronization period.

In an example, a computer-readable non-transitory medium storing executable instructions, which when executed by a computer system, cause the computer system to receive from an orchestrator a quota having a value of more than one. A local counter stored in a memory of the computer system is caused to be set to the value of the quota. In response to a request to use a shared resource received from an end device, the computer system is caused to serve the request and then decrement the local counter stored in the memory by one. When the local counter stored in the memory reaches zero, the computer system is caused to stop serving requests. At an end of a synchronization period, the computer system is caused to send synchronization data to the orchestrator. These synchronization data include the value of the local counter stored in the memory at the end of the synchronization period.

In an example, a system includes a means for determining a quota for each of a plurality of nodes, each quota having a value of more than one. The system further includes a means for setting a local counter to set a local counter stored in a memory of each of the nodes to the value of the relevant quota. The system further includes a means for serving a request to use a shared resource made by an end device. The request is served by a first node in the nodes, where the local counter stored in the memory of the first node is more than zero. The system further includes a means for decrementing a local counter to decrement the local counter stored in the memory of the first node by one after serving the request. The system further includes a transmission means for sending, at an end of a synchronization period, synchronization data from each of the nodes to the means for determining a quota. These synchronization data include the values of the local counters stored in the memories of the nodes at the end of the synchronization period.

In an example, a system includes a shared resource and a plurality of nodes. Each of the nodes is in communication with the shared resource and has a memory and a processor in communication with the memory. The system further includes an orchestrator that has a controller and is in communication with the shared resource and the nodes. The controller is configured to determine a quota for each of the nodes, each quota having a value of more than one. The processor of each of the nodes is configured to set a local counter stored in the memory of the relevant node to the value of the relevant node's quota. The processor of each of the nodes connects to the shared resource a quantity of times not exceeding the relevant node's quota. Each connection is made without the relevant node requiring further permission from the orchestrator. The processor of each of the nodes decrements the relevant node's quota by one for each connection that is made to the shared resource. At an end of a synchronization period, the processor of each of the nodes sends synchronization data to the controller. These synchronization data include the value of the relevant node's local counter at the end of the synchronization period.

In an example, a method includes determining, by an orchestrator, a quota for each of a plurality of nodes, each quota having a value of more than one. A local counter stored in a memory of each of the nodes is set to the value of the relevant quota. A connection is made between a first node in the nodes and a shared resource a quantity of times not exceeding the first node's quota. Each connection is made without the first node requiring further permission from the orchestrator. For each connection that is made to the shared resource, the relevant node's quota is decremented by one. At an end of a synchronization period, synchronization data is sent from each of the nodes to the orchestrator. These synchronization data include the values of the local counters stored in the memories of the nodes at the end of the synchronization period.

In an example, a computer-readable non-transitory medium storing executable instructions, which when executed by a computer system, cause the computer system to receive from an orchestrator a quota having a value of more than one. A local counter stored in a memory of the computer system is caused to be set to the value of the quota. A connection is then caused to be made between the computer system and a shared resource a quantity of times not exceeding the quota. Each connection is made without the computer system requiring further permission from the orchestrator. For each connection that is made to the shared resource, the quota is caused to be decremented by one. At an end of a synchronization period, synchronization data is sent from the computer system to the orchestrator. These synchronization data include the value of the local counter stored in the memory of the computer system at the end of the synchronization period.

In an example, a system includes a means for determining a quota for each of a plurality of nodes, each quota having a value of more than one. The system further includes a means for setting a local counter to set a local counter stored in a memory of each of the nodes to the value of the relevant quota. The system further includes a communication means for connecting a first node in the nodes to a shared resource a quantity of times not exceeding the first node's quota. Each connection is made without the first node requiring further permission from the means for determining a quota. The system further includes a means for decrementing a local counter to decrement the local counter stored in the memory of the first node by one for each connection made to the shared resource. The system further includes a transmission means for sending, at an end of a synchronization period, synchronization data from each of the nodes to the means for determining a quota. These synchronization data include the values of the local counters stored in the memories of the nodes at the end of the synchronization period.

Additional features and advantages of the disclosed system and method are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
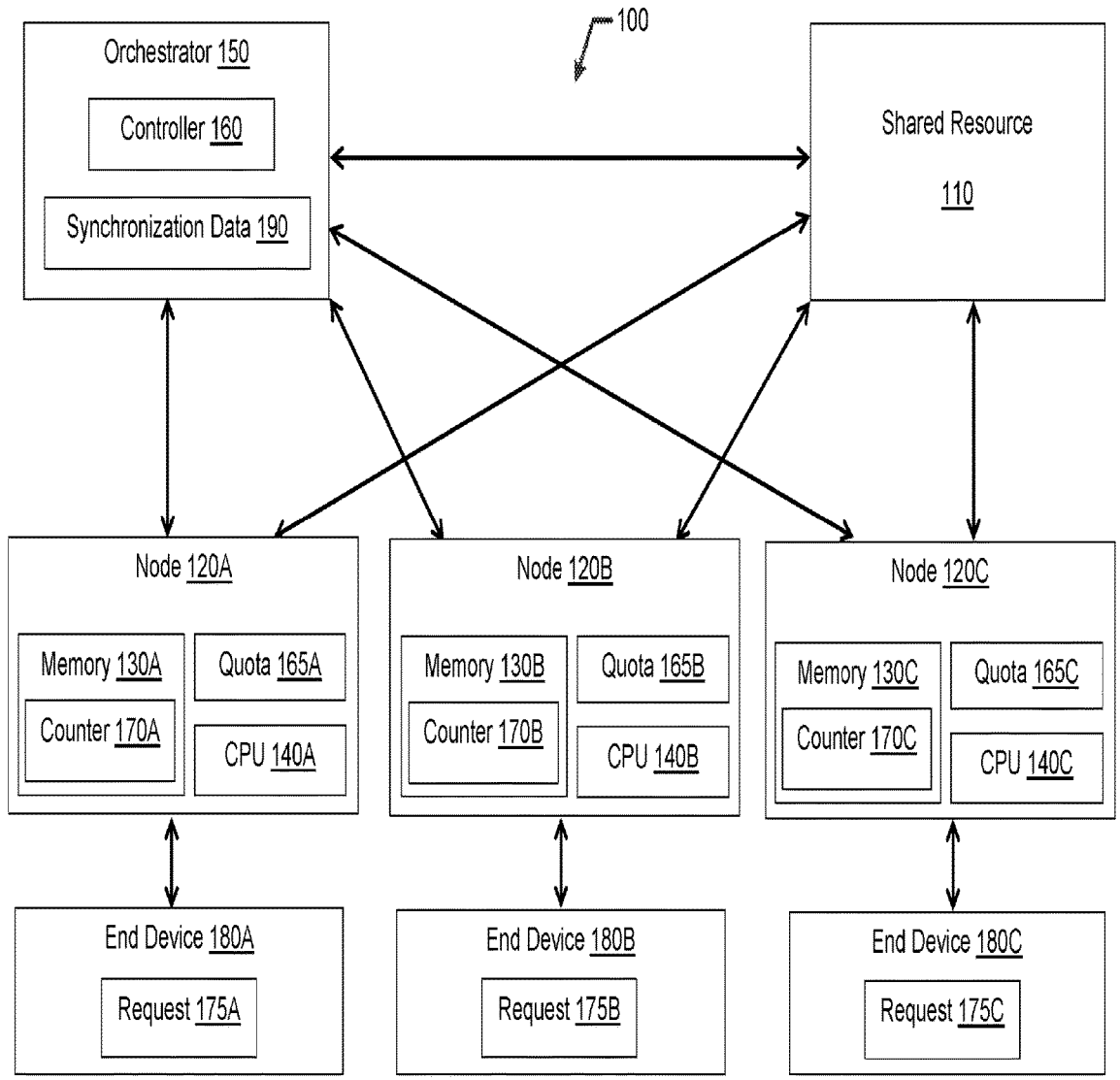
FIG. 1 illustrates a block diagram of an example system for managing access to a shared resource according to an example embodiment of the present disclosure.

Techniques are disclosed for managing access to a shared resource. Computing resources may be shared amongst several end users and computing devices. For example, a server process executing on a physical or virtual machine may need to be accessed and used by several network-connected clients. Use of a shared resource must be managed carefully in order to avoid the resource being overwhelmed with service requests and/or executing too many concurrent processes on behalf of end devices.

A single shared counter is commonly used to manage a shared resource. The counter is shared because it is used to track requests to access and use the resource made by multiple different end users and devices. For example, application program interface (API) management systems may make use of a shared counter for rate limiting and tracking use of each end point that the API makes available to multiple end devices. The shared counter may be maintained on a database implemented on the server, or other computing system, hosting the API. Each time an end device accesses and uses an API end point, a database synchronization process occurs pursuant to which the shared counter is decremented by a specific number of units. When the shared counter reaches zero, the API management system stops allowing any further end devices to access and use the end point. The shared counter is used to manage multiple end devices using the API and listening to rate limiting authorization requests. Most authorization requests made by an end device cause a single hit to be reported for rate limiting metrics. Each request, therefore, requires an individual connection to be made to the API management system. A full round trip is, therefore, required between each end device and the API management system for each authorization request and database synchronization operation. This consumes valuable processing time and results in significant network latency issues.

The present disclosure aims to provide an improved system for managing access and use of shared resources. Instead of using the above-described shared counter for rate limiting purposes, a caching scheme is implemented where a quota of the shared counter that would otherwise be used is determined for each of a plurality of computing devices (hereinafter referred to as "nodes") and distributed to the nodes. Each node maintains its own local counter that is set to the value of the relevant quota determined for the node. The local counter is decremented by a specific number of units by the relevant node after each authorization request that is received and served by the node. Each node is free to consume its quota by authorizing requests to access and use the shared resource received from end devices until its local counter reaches zero. The nodes can advantageously receive and authorize each request without having to connect to a master node, or other central authorization authority, to request permission.

Each node reports the consumption of its quota at one or more synchronization time intervals. The disclosed system uses the reported information to estimate the average consumption per node and to determine whether more or less quota should be determined subsequently for each node. The quotas that are determined for the nodes are each sufficiently large so that the disclosed system serves to reduce the overall amount of network traffic, latency and processor time required to implement and manage rate limited access to the shared resource. Each quota is, however, kept below a designated upper limit in order to ensure that inactive nodes, or nodes that only receive authorization requests infrequently, do not monopolize the system and compromise overall service throughput and efficiency.

FIG. 1 depicts a high-level component diagram of an example system 100 in accordance with one or more aspects of the present disclosure. The system 100 may include a shared resource 110 and a plurality of nodes 120A-C. Whilst three nodes 120A-C are depicted in the example in FIG. 1, the system 100 may include an alternative number of nodes 120A-C greater than one. The nodes 120A-C are each in communication with the shared resource 110 and may include memory devices (e.g., 130A-C) and one or more processors (e.g., CPU 140A-C) in communication with the respective memory devices 130A-C.

As used herein, processor 140A-C refers to a device capable of executing instructions encoding arithmetic, logical, and/or I/O operations and includes both a physical and a virtual processor. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data.

In the example, the system 100 also includes an orchestrator 150 that is in communication with the shared resource 110 and each of the nodes 120A-C. The orchestrator 150 includes a controller 160 that is configured to determine a quota 165A-C for each of the nodes 120A-C, where each quota 165A-C typically has a value of more than one. Each of the processors 140A-C is configured to set a local counter 170A-C stored in the memory device 130A-C of the relevant node 120A-C to the value of the quota 165A-C determined by the orchestrator 150 for the relevant node 120A-C. The processors 140A-C are further configured such that in response to receiving a request 175A-C to use the shared resource 110 from an end device 180A-C, the relevant processor 140A-C serves the request 175A-C and decrements the local counter 170A-C stored in the memory device 130A-C of the relevant node 120A-C by one. Each processor 140A-C stops serving requests 175A-C when a value of the local counter 170A-C stored in the memory device 130A-C of the relevant node 120A-C reaches zero. At an end of a synchronization period, each of the processors 140A-C sends synchronization data 190 to the controller 160. These synchronization data 190 include the value of the local counter 170A-C stored in the memory device 130A-C of the relevant node 120A-C at the end of the synchronization period.

More particularly, the shared resource 110 may include a server that is accessed and used by the end devices 180A-C on a shared basis. Each end device 180A-C may intermittently need to contact the server, or a process executing on the server, and request one or more tasks to be executed on behalf of the relevant end device 180A-C. For example, the shared resource 110 may include an API system that is hosted on a server that makes available one or more API end points to the end devices 180A-C. In an example, the API may be provided via 3scale or other API management system (e.g., MuleSoft, Mashery, Apigee, Layer 7).

In an example, the processors 140A-C of the nodes 120A-C may be configured to perform a distributed task with the shared resource 110.

The controller 160 of the orchestrator 150 is configured to determine an individual quota 165A-C for each of the nodes 120A-C. For example, the controller 160 depicted in FIG. 1 may initially determine a quota 165A having a value of five for node 120A and a quota having a value of three 165B-C for each of the nodes 120B and 120C. Once quotas 165A-C are determined by the orchestrator 150 for the nodes 120A-C, each of the nodes 120A-C sets the respective local counter 170A-C stored in the memory device 130A-C of the relevant node 120A-C to the value of the relevant quota 165A-C and begins listening out for authorization requests 175A-C that may be made by the end devices 180A.

The processors 140A-C of the nodes 120A-C are configured such that in response to receiving an individual request 175A-C to use the shared resource 110 from an end device 180A-C, the relevant processor 140A-C serves the request 175A-C and decrements the value of the local counter 170A-C stored in the memory device 130A-C of the relevant node 120A-C by one. Each of the nodes 120A-C continues to receive and serve requests 175A-C made by end devices 180A-C until the local counter 170A-C stored in the memory device 130A-C of the relevant node 120A-C reaches zero. At this point, the relevant node 120A-C stops listening out for, and processing, further requests. For example, if the orchestrator 150 determines a quota 165A of five for node 120A in FIG. 1, the node 120A may serve no more than five individual requests 175A-C to use the shared resource 110 made by the end devices 180A-C. Where the orchestrator 150 determines a quota 165B-C of three for each of the nodes 120B and 120C in FIG. 1, the nodes 120B, 120C may each serve no more than three individual requests 175A-C to use the shared resource 110 made by the end devices 180A-C.

The processors 140A-C of the nodes 120A-C are further configured such that at the end of a designated synchronization period, the processors 140A-C send synchronization data 190 to the controller 160 that include the values of the local counters 170A-C stored in the memory devices 130A-C of the nodes 120A-C at the end of the synchronization period. These synchronization data 190 may then be used by the controller 160 to calculate the average quota consumed per node 120A-C. The calculation may be based solely on the synchronization data 190 received for the current synchronization period or on combined synchronization data 190 received for multiple synchronization periods.

The controller 160 may then, in turn, determine and issue further quotas for the nodes 120A-C using the average consumption statistics to decide whether each node 120A-C should subsequently receive a larger or smaller quota. For example, the controller 160 may determine that a first node 120A in the nodes A-C should subsequently receive a quota having a value of zero.

In an example, the controller 160 may be configured to determine the quota 165A-C for each of the nodes 120A-C according to an allocation policy. The allocation policy prescribes the factors that the controller 160 may consider when calculating the value of each quota 165A-C that is determined for each node 120A-C. For example, these factors may include and/or take into account average consumption of previously issued quotas, network traffic and capacity conditions (including historic, present and predicted conditions) and load balancing metrics. The allocation policy may be updated by the controller 160 based on the synchronization data 190 received from each of the nodes 120A-C at the end of the synchronization period.

In an example, one of the nodes 120A-C may receive and serve an unexpectedly high number of requests to use the shared resource 110 from the end devices 180A-C causing the node's local counter to reach zero before the end of the synchronization period. The controller 160 may further be configured such that, on receiving a notification from a node 120A-C that this situation has occurred, the controller 160 immediately determines and issues an additional quota for the relevant node 120A-C notwithstanding that the synchronization period has yet to expire.

In an example, the controller 160 may ascertain that determining a quota 165A-C of more than one for one or more of the nodes 120A-C may lead to the relevant nodes 120A-C serving authorization requests 175A-C in a manner that has adverse consequences including, for example, over committing the shared resource 110. The controller 160 may, for example, ascertain that there is an insufficiently safe margin to issue quotas 165A-C of more than one to the nodes 120A-C due to prevalent network conditions, historic quota usage statistics and/or relevant load balance metrics for the shared resource 110 and nodes 120A-C. The controller 160 may, therefore, further be configured such that, in these situations, the controller 160 determines a quota 165A-C having a value of only one for each of the relevant nodes 120A-C and requires each of the relevant nodes 120A-C to send synchronization data 190 to the controller 160 after serving each individual request 175A-C to use the shared resource 110 received from an end device 180A-C. Essentially, in this example each node 120A-C is required to report each individual decrease of its local counter 170A-C to the controller 160. Alternatively, the controller 160 may be configured such that, in these situations, the controller 160 determines a quota 165A-C of zero for each of the relevant nodes 120A-C and then requires them to send an authorization request 175A-C to the controller 160 each and every time they receive an authorization request 175A-C from an end device 180A-C. Essentially, in this example each of the relevant nodes 120A-C simply operates to forward to the controller 160 each individual authorization request 175A-C received from an end device 180A-C so that the controller 160 may evaluate and process the request 175A-C on behalf of the relevant node 120A-C.

In an example, the nodes 120A-C may be configured so that they are each entitled to authorize a quantity of requests to use the shared resource 110 that is higher than the value of the relevant quota 165A-C for the node 120A-C, but does not exceed a specified soft limit above the quota 165A-C.

The soft limit may be determined by the orchestrator 150 and issued to the nodes 120A-C. For example, the orchestrator 150 may determine for each of the three nodes 120A-C a quota of 1,000, thus providing a total shared quota of 3,000, and a 1% soft limit so that each node 120A-C may authorize up to 1,010 requests to access the shared resource 110 during a synchronization period before further requests are limited. In this example, whilst each node 120A-C may individually exceed its 1,000 quota, it is unlikely that all three of the nodes 120A-C will cumulatively authorize more than 1,000 requests during each synchronization period. The maximum risk of overcommit for the shared resource 110 is limited to 1%—i.e., the total shared quota of 3,000 may not be exceeded by more than 30 in aggregate. However, the maximum overcommit is only reached in rare circumstances when each of the three nodes 120A-C reaches its soft limit and serves a full 1,010 authorization requests during the relevant synchronization period. For example, in circumstances where a first of the nodes 120A serves more than 1,000 authorization requests during a synchronization period, the other two nodes 120B-C will typically serve less than 1,000 requests before the synchronization period expires. The shared resource 110 may be dispensed faster (due to the first node 120A exceeding its 1,000 quota before the end of the synchronization period) but with only a limited risk of overcommit that is controllable using the soft limit.

Local connections within each node 120A-C, including the connections between a processor 140A-C and a memory device 130A-C may be provided by one or more local buses of suitable architecture, for example, peripheral component interconnect (PCI).

The nodes 120A-C may be in communication with the shared resource 110, orchestrator 150 and end devices 180A-C using a variety of techniques, ranging from a point-to-point processor interconnect, to a system area network, such as an Ethernet-based network.

In the example depicted in FIG. 1, the orchestrator 150 may be implemented using a standalone server where the controller 160 of the orchestrator 150 is executed on a processor included with the orchestrator 150 (not shown). The shared resource 110 is separate from the orchestrator 150. Alternatively, the shared resource 110 may be coupled to the orchestrator 150. For example, the shared resource 110 may be a server process or thread, that is providing and managing one or more API end points, executing on the processor included with the orchestrator 150.

Figure 2:
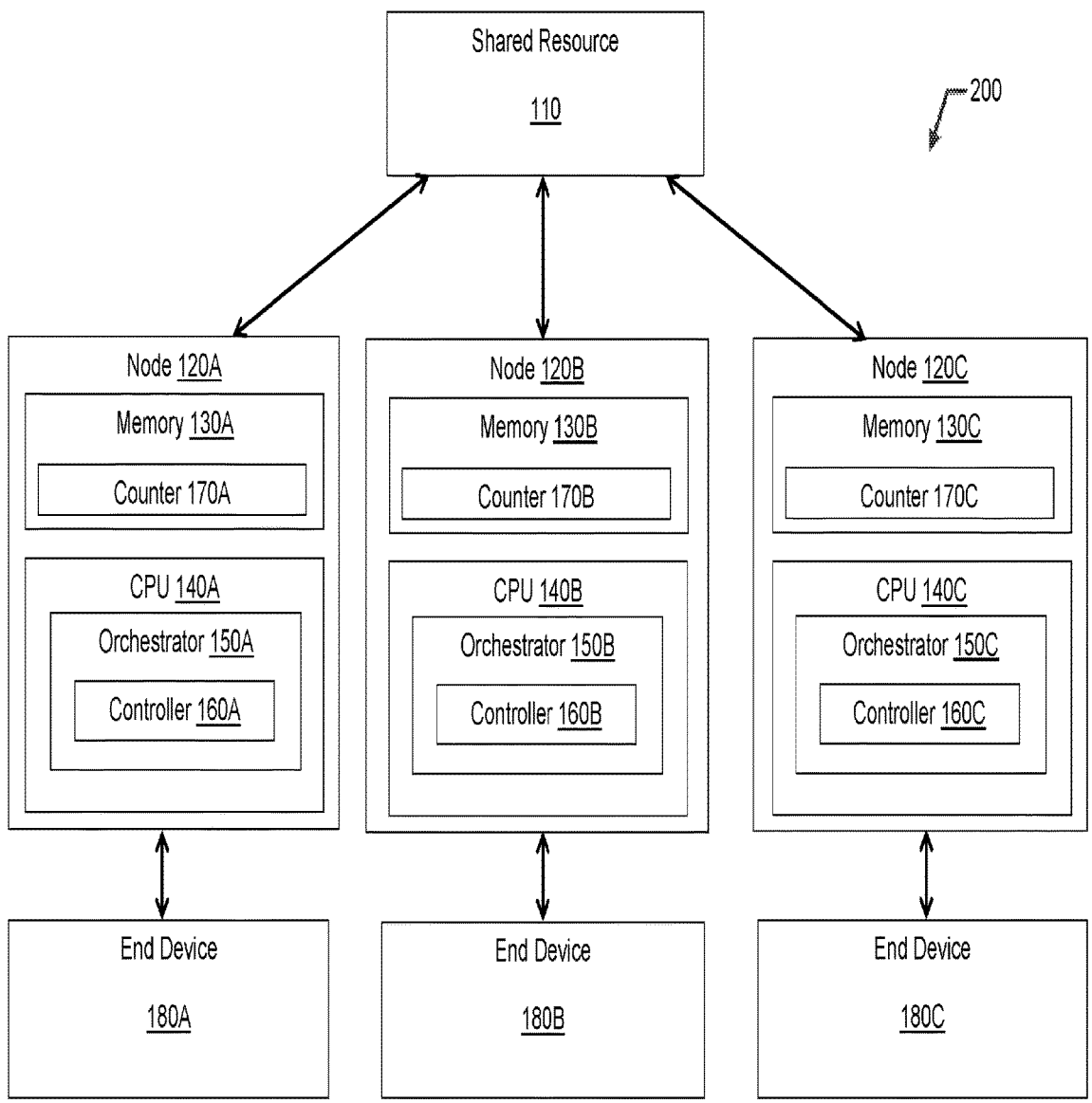
FIG. 2 illustrates a block diagram of a further example system for managing access to a shared resource according to an example embodiment of the present disclosure.

FIG. 2 depicts a further example where the orchestrator 150 is not implemented using a standalone server or other computing device. Instead, the controller 160 of the orchestrator 150 is configured to operate using distributed control logic executing, at least in part, on a plurality of the processors 140A-C of the nodes 120A-C. This configuration advantageously avoids the orchestrator 150 being a single point of failure and allows the orchestrator 150 to take advantage of increased availability, throughput and scalability that can be achieved with distributed computing.

Figure 3:
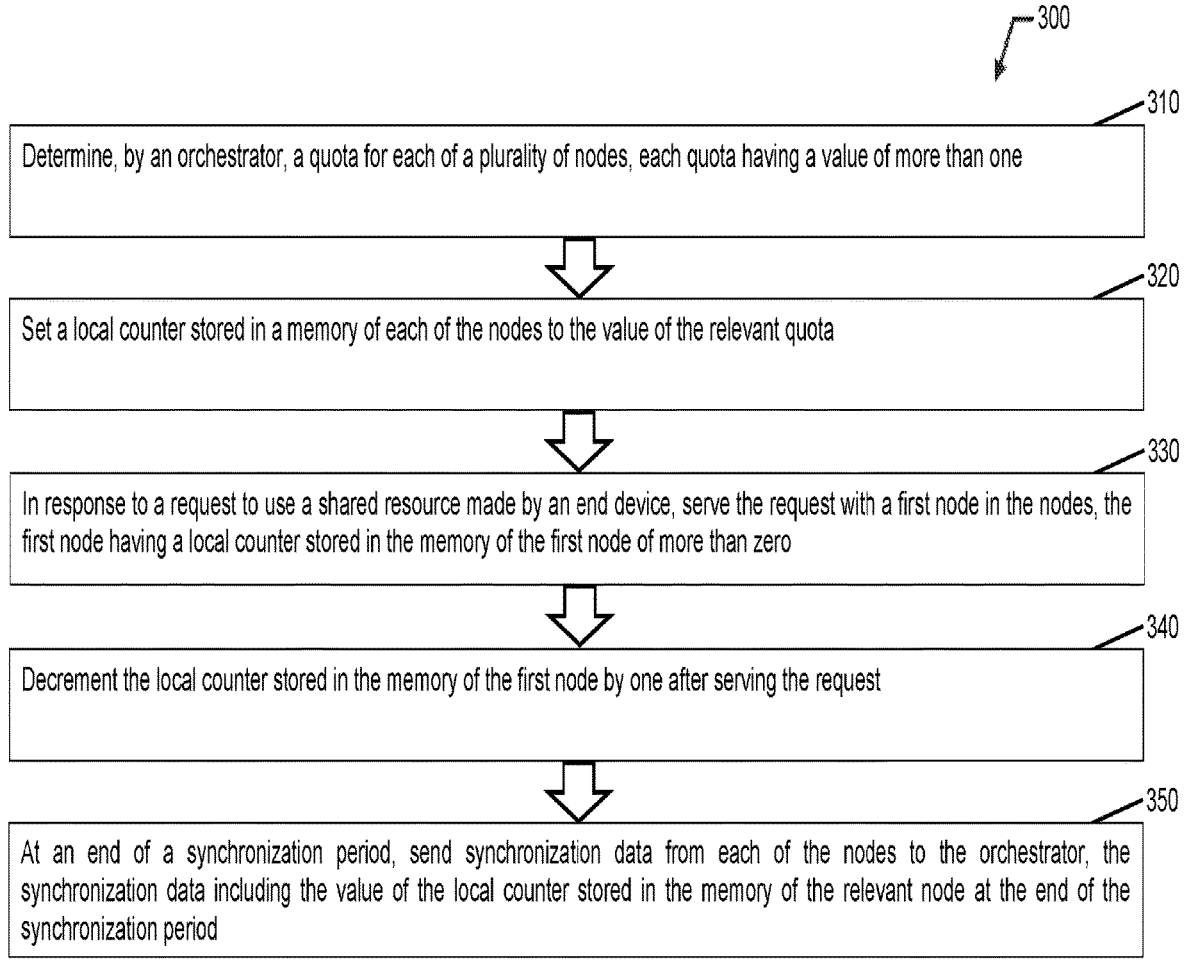
FIG. 3 illustrates a flowchart of an example process for managing access to a shared resource according to an example embodiment of the present disclosure.

FIG. 3 illustrates a flowchart of an example method 300 in accordance with an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may include hardware (circuitry, dedicated logic, etc.), software, or a combination of both.

The example method 300 includes determining, by an orchestrator, a quota for each of a plurality of nodes, each quota having a value of more than one (block 310). For example, the method 300 may include determining, by an orchestrator 150, a quota 165A-C having a value of 1,000 for each of three nodes 120A-C. Each of the three nodes 120A-C may comprise a server configured to receive and serve requests from three end devices 180A to access and use a shared resource 110. The shared resource 110 may be a ticketing server configured to receive and serve requests to book tickets to an event, such as a music concert, from the three end devices 180. The three end devices 180 may each comprise a personal computer being operated by a person who wants to book one or more tickets to the event.

The method 300 further includes setting a local counter stored in a memory device of each of the nodes to the value of the relevant quota (block 320). For example, the local counters 170A-C stored in the memory devices 130A-C of the three servers 120A-C may each be set to 1,000 in accordance with the quotas 165A-C determined by the orchestrator 150.

In response to a request to use a shared resource that is made by an end device, the method further includes serving the request with a first node in the nodes, where the local counter stored in the memory device of the first node is more than zero (block 330). For example, in response to a request 175A-C to use the ticketing server 110 that is made by one of the end devices 180A, the request 175A-C may be served using a first server 120A where the local counter 170A stored in the memory device 130A of the first server 120A is more than zero.

The method 300 further includes decrementing the local counter stored in the memory device of the first node by one after serving the request (block 340). For example, the local counter 170A stored in the memory device 130A of the first server 120A may be decremented by one after serving the request to use the ticketing server 110 made by the first end device 180A so that the value of the local counter 170A is then 999. Each of the three server 120A-C may then continue to receive and serve further requests to use the ticketing server 110 from the end devices 180A-C until the local counter 170A-C stored in the memory device 130A-C of the relevant server 120A-C reaches zero.

At an end of a synchronization period, synchronization data is sent from each of the nodes to the orchestrator, which includes the value of the local counter stored in the memory device of the relevant node at the end of the synchronization period (block 350). For example, at an end of synchronization period of one second, synchronization data 190 may be sent from each of the three servers 120A-C to the orchestrator 150, which includes the value of the local counters 170A-C stored in the memory devices 130A-C of the servers 120A-C at that point in time.

Figure 4:
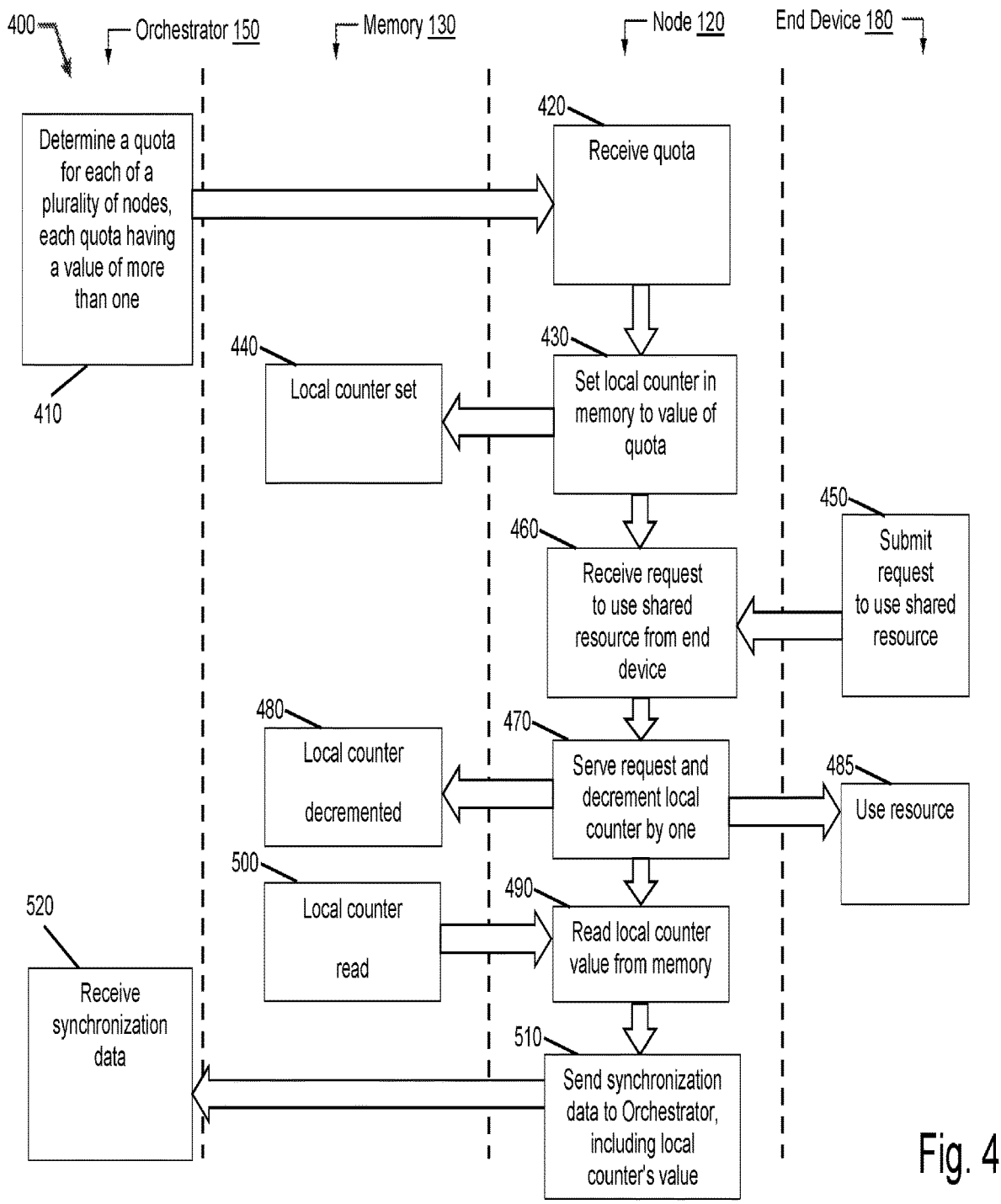
FIG. 4 illustrates a flow diagram of an example process for managing access to a shared resource according to an example embodiment of the present disclosure.

FIG. 4 illustrates a flowchart of an example method 400. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional.

The method 400 includes determining, by an orchestrator 150, a quota 165A-C for each of a plurality of nodes 120A-C, each quota 165A-C having a value of more than one (block 410). In the illustrated example, an individual quota 165A-C is determined by the orchestrator 150 for an individual node 120. The quota 165A-C is received by the node 120 (block 420) and the node 120 then sets a local counter 170 stored in a memory device 130 of the node 120 to the value of the quota 165A-C that is received (block 430). The local counter 170 is stored in the memory device 130 (block 440) using a format and/or data structure that allows its value to be efficiently queried and updated. For example, the local counter 170 may be stored as an integer in static or dynamic memory allocated on the memory device 130.

In the example, an end device 180 submits a request 175A-C to the node 120 to use the shared resource 110 (block 450) which is received by the node 120 (block 460). In response to the request 175A-C, the node 120 serves the request 175A-C and then causes the local counter 170 stored in the memory device 130 to be decremented by one (blocks 470 and 480). The end device 180 is then authorized to use the shared resource 110 (block 485). The node 120 may continue to receive and serve further authorization requests 175A-C until the value of its local counter 170 reaches zero.

At an end of a synchronization period, the node 120 reads the current value of the local counter 170 from the memory device 130 (blocks 490 and 500). For example, the node 120 may cause the value of the local counter 170 to be fetched from the memory device 130 and written into a local register of the processor 140 included with the node 120. The node 120 then sends synchronization data 190 to the orchestrator 150 that includes the value of the local counter (block 510), which is subsequently received by the orchestrator 150 (block 520). The orchestrator 150 may then use the synchronization data 190 to determine and issue further quotas for the nodes 120A-C.

Figure 5:
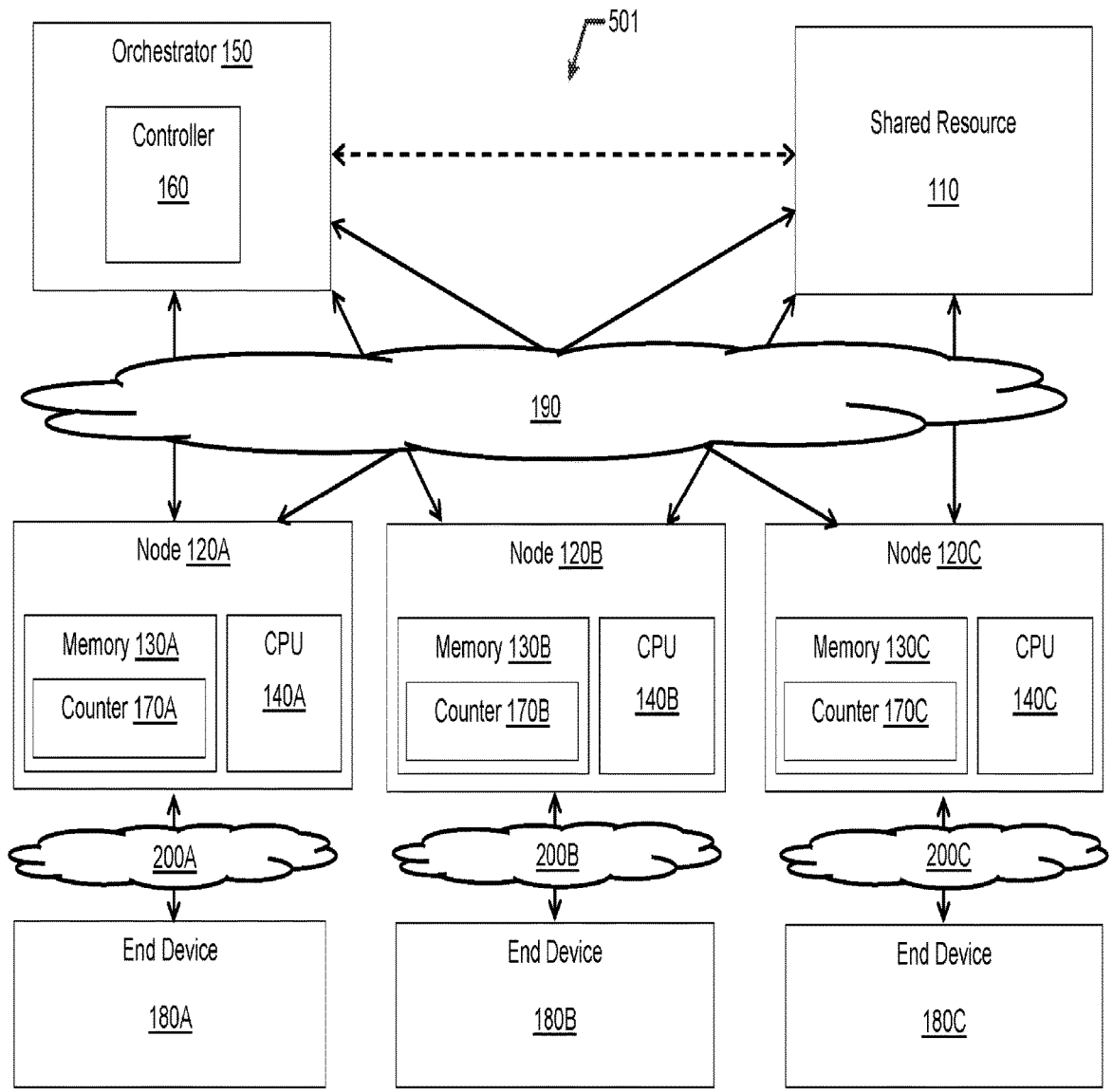
FIG. 5 illustrates a block diagram of an example system for managing access to a shared resource according to an example embodiment of the present disclosure.

An example system 501 is depicted in FIG. 5, and each of the nodes 120A-C used in the disclosed systems and methods may be in communication with the end devices 180A-C via a computer network 200A-C. Similarly, each of the nodes 120A-C may also be in communication with the orchestrator 150 and the shared resource 110 via a computer network 190. Each computer network 190, 200A-C may use a variety of techniques, ranging from a point-to-point processor interconnect, to a system area network, such as an Ethernet-based network.

Figure 6:
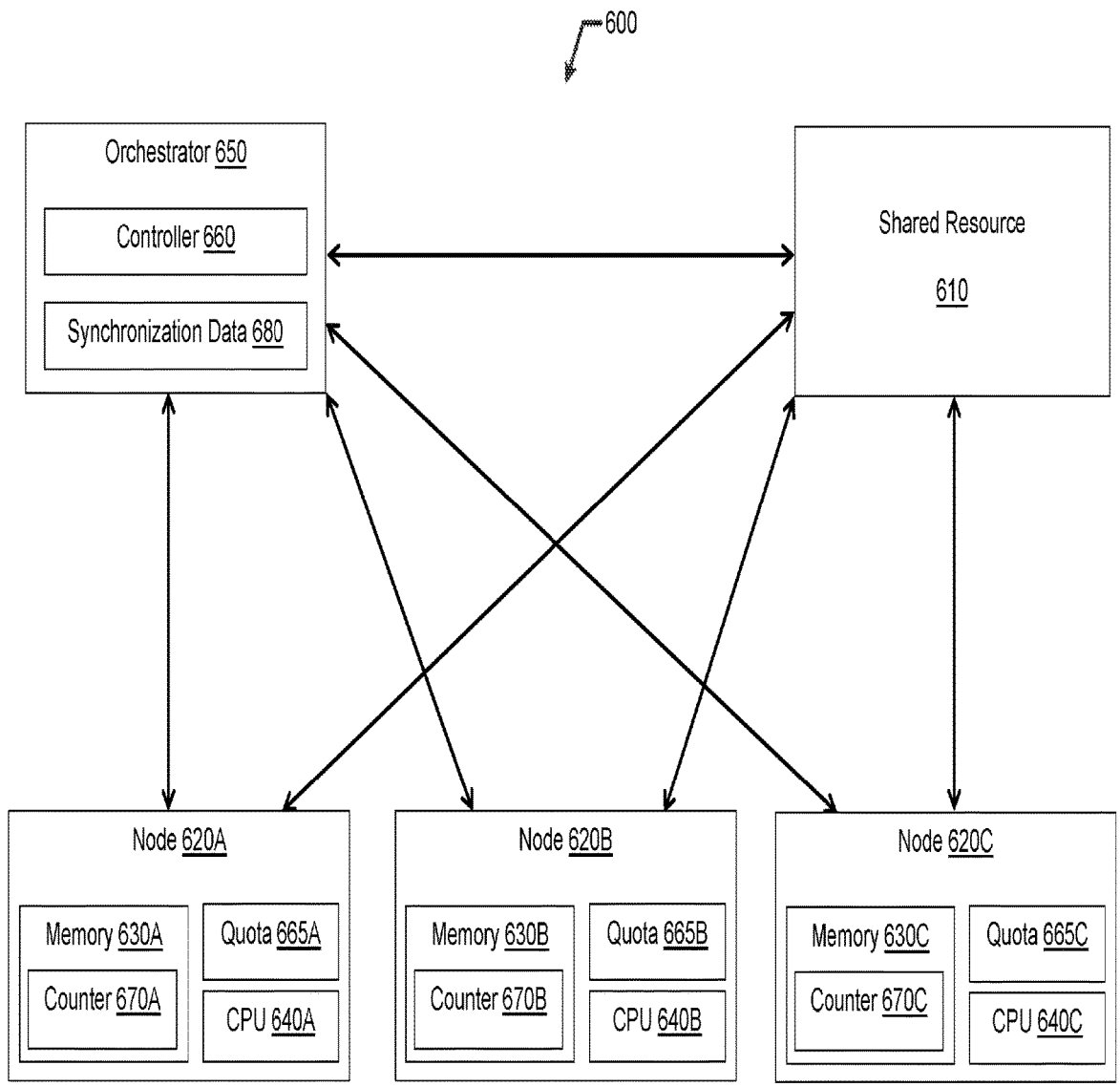
FIG. 6 illustrates a block diagram of an example system for managing access to a shared resource according to an example embodiment of the present disclosure.

FIG. 6 depicts a high-level component diagram of an example system 600 in accordance with a further example embodiment of the present disclosure. The system 600 may include a shared resource 610 and a plurality of nodes 620A-C. Whilst three nodes 620A-C are depicted in the example, the system 600 may include an alternative number of nodes 620A-C greater than one. The nodes 620A-C are each in communication with the shared resource 610 and may include memory devices (e.g., 630A-C) and one or more processors (e.g., CPU 640A-C) in communication with the respective memory devices 630A-C. The system 600 also includes an orchestrator 650 that is in communication with the shared resource 610 and each of the nodes 620A-C. The orchestrator 650 includes a controller 660 that is configured to determine a quota 665A-C for each of the nodes 620A-C, where each quota 665A-C typically has a value of more than one. Each of the processors 640A-C is configured to set a local counter 670A-C stored in the memory device 630A-C of the relevant node 620A-C to the value of the quota 665A-C that is determined by the orchestrator 650 for the relevant node 620A-C. Each of the processors 640A-C is further configured such that when the relevant node 620A-C requires access to the shared resource 610, the processor 640A-C establishes a connection with the shared resource 610 and then decrements the local counter 670A-C stored in the memory device 630A-C of the relevant node 620A-C by one. Each connection between the relevant processor 640A-C and the shared resource 610 may be established without the relevant processor 640A-C requiring further permission from the orchestrator 650. Each of the processors 640A-C ceases establishing connections with the shared resource 610 when the local counter 670A-C stored in the memory device 630A-C of the relevant node 620A-C reaches zero. At an end of a synchronization period, each processor 640A-C sends synchronization data 690 to the controller 660 which includes the value of the local counter 670A-C stored in the memory device 630A-C of the relevant node 120A-C at the end of the synchronization period.

More particularly, the shared resource 610 may include a server that is in communication with the nodes 620A-C. Each of the nodes 620A-C may need to connect to the server, or a particular process executing on the server, to request one or more tasks to be executed on behalf of the relevant node 620A-C. For example, the shared resource 610 may include an API that is hosted on a server and that makes available one or more end points to the nodes 620A-C. The nodes 620A-C may include, for example, one or more personal computers or mobile devices executing application software that intermittently needs to connect to an API end point made available on the server.

The controller 660 of the orchestrator 650 is configured to determine an individual quota 665A-C for each of the nodes 620A-C. For example, the controller 660 depicted in FIG. 6 may initially determine a quota 665A-C having a value of five for node 620A and a quota 665A-C having a value of three for each of the nodes 620B and 620C. Once a quota 665A-C is determined by the controller 660 for a node 620A-C, the relevant node 620A-C sets the local counter 670A-C stored in the memory device 630A-C of the node 620A-C to the value of the quota 665A-C.

The processors 640A-C are each configured such that when access to the shared resource 610 is required (for example, when an application program executing on the relevant processor 640A-C needs to access an API end point served by the shared resource 610), the relevant processor 640A-C establishes a connection with the shared resource 610 and then decrements the local counter 670A-C stored in the memory device 630A-C of the relevant node 620A-C by one. Each connection between a processor 640A-C and the shared resource 610 may be established without the relevant processor 640A-C requiring further permission from the orchestrator 650.

Each processor 640A-C may continue to establish connections with the shared resource 610 until the local counter 670A-C stored in the memory device 630A-C of the relevant node 620A-C reaches zero. At this point, the relevant node 620A-C stops establishing any further connections. For example, if the orchestrator 650 determines a quota 665A-C of five for node 620A in FIG. 6, then the node 620A may establish no more than five individual connections with the shared resource 610. If the orchestrator 650 determines a quota 665A-C of three for each of the nodes 620B and 620C in FIG. 6, then these nodes 620B, 620C may each establish no more than three individual connections with the shared resource 610.

The processors 640A-C of the nodes 620A-C are further configured such that at the end of a designated synchronization period, the processors 640A-C send synchronization data 690 to the controller 660 including the value of the local counters 670 stored in the respective memory devices 630A-C at the end of the synchronization period. These synchronization data 690 may then be used by the controller 660 to estimate the average quota consumption per node 620A-C. The controller 660 may then determine and issue further quotas for the nodes 620A-C using the average consumption statistics to decide whether each node 620A-C should receive a larger or smaller quota 665A-C.

In an example, the controller 660 may be configured to determine the quota 665A-C for each of the nodes 620A-C according to an allocation policy. The allocation policy prescribes the factors that the controller 660 may consider when calculating the value of each quota 665A-C for each node 620A-C. For example, these factors may include and/or take into account average consumption of previously issued quotas, network traffic and capacity conditions (including historic, present and predicted conditions) and load balancing metrics. The allocation policy may be updated by the controller 660 based on the synchronization data 690 that is received from each of the nodes 620A-C at the end of the synchronization period.

In an example, one of the nodes 620A-C may establish connections with, and use, the shared resource 610 at an unexpectedly high rate causing the node's local counter 670A-C to reach zero before the end of the designated synchronization period. The controller 660 may, therefore, further be configured such that, on receiving a notification from a particular node 620A-C that this situation has occurred, the controller 660 immediately determines and issues an additional quota for the relevant node 620A-C notwithstanding that the synchronization period has yet to expire.

In an example, the controller 660 may ascertain that determining a quota 665A-C of more than one to one or more of the nodes 620A-C may lead to the relevant nodes 620A-C establishing connections with the shared resource 610 at a rate that has undesirable consequences including, for example, over committing the shared resource 110. The controller 660 may, for example, determine that there is an insufficiently safe margin to issue quotas of more than one due to prevalent network conditions, historic quota usage statistics and/or relevant load balance metrics for the shared resource 610 and nodes 620A-C. The controller 660 may, therefore, further be configured such that, in these situations, the controller 660 determines a quota 665A-C of one for each of the relevant nodes 620A-C and then requires them to send synchronization data 690 to the controller 660 after establishing each individual connection with the shared resource 110. Essentially, in this example, each node 620A-C is required to report each individual decrease of its local counter 670A-C. Alternatively, the controller 660 may be configured such that, in these situations, the controller 660 determines a quota 665A-C of zero for each of the relevant nodes 620A-C and then requires them to send an authorization request to the controller 660 individually each and every time they require access to the shared resource 610.

Local connections within each node 620A-C, including the connections between a processor 640A-C and a memory device 630A-C may be provided by one or more local buses of suitable architecture, for example, peripheral component interconnect (PCI).

In the example depicted in FIG. 6, the orchestrator 650 may be implemented using a standalone server where the controller 660 of the orchestrator 650 is executed on a processor included with the orchestrator 650 (not shown) and the shared resource 610 is separate to the orchestrator 650. In another example, the shared resource 610 may be coupled to the orchestrator 650. For example, the shared resource 610 may be a server process or thread, providing and managing one or more API end points, executing on the processor included with the orchestrator 650.

Figure 7:
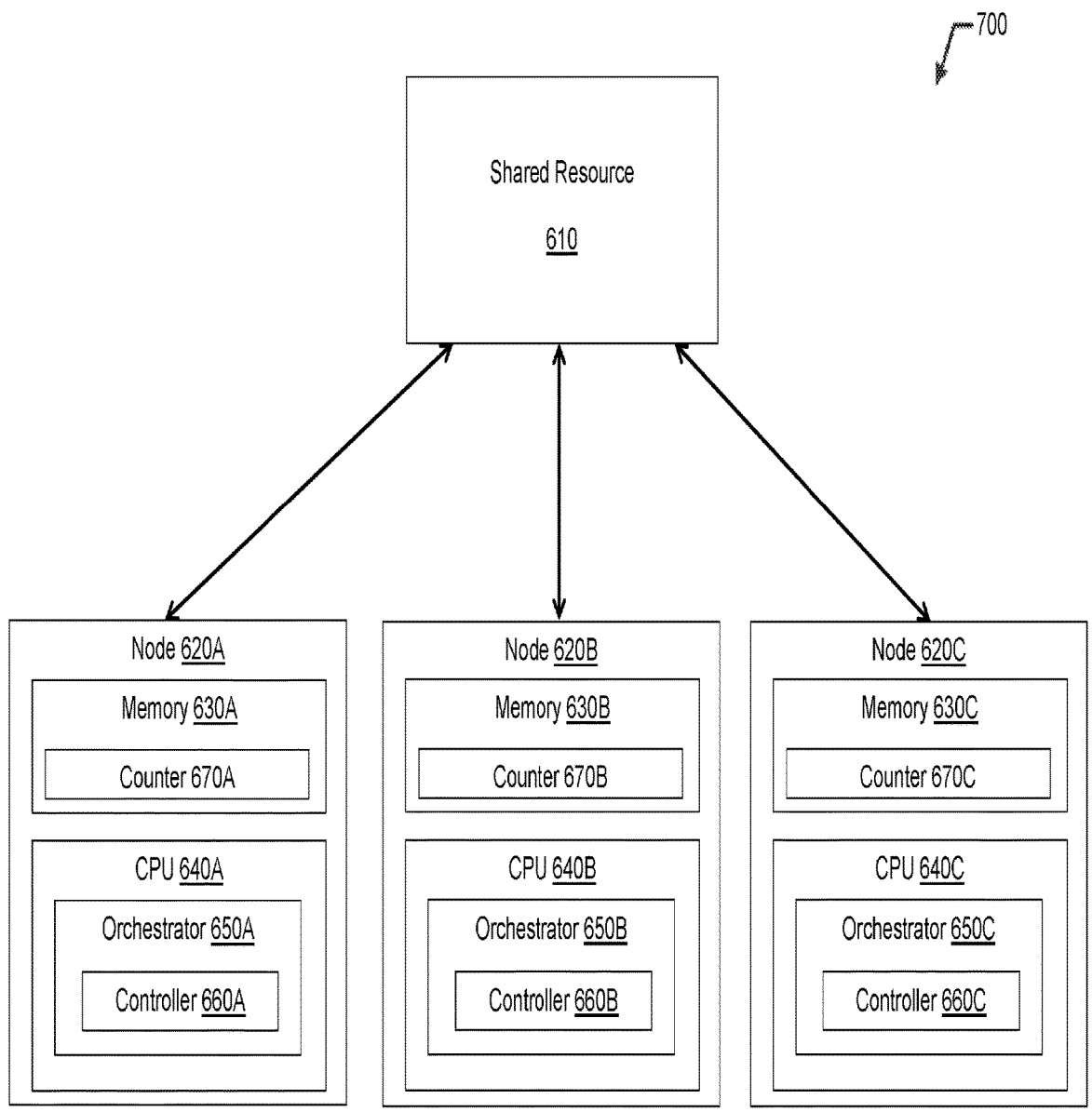
FIG. 7 illustrates a block diagram of a further example system for managing access to a shared resource according to an example embodiment of the present disclosure.

FIG. 7 depicts a further example where the orchestrator 650 is not implemented using a standalone server or other computing device. Instead, the controller 660 of the orchestrator 650 is configured to operate using distributed control logic executing, at least in part, on a plurality of the processors 640A-C of the nodes 620A-C. This configuration advantageously avoids the orchestrator 650 being a single point of failure and allows the orchestrator 650 to take advantage of increased availability, throughput and scalability that can be achieved with distributed computing.

Figure 8:
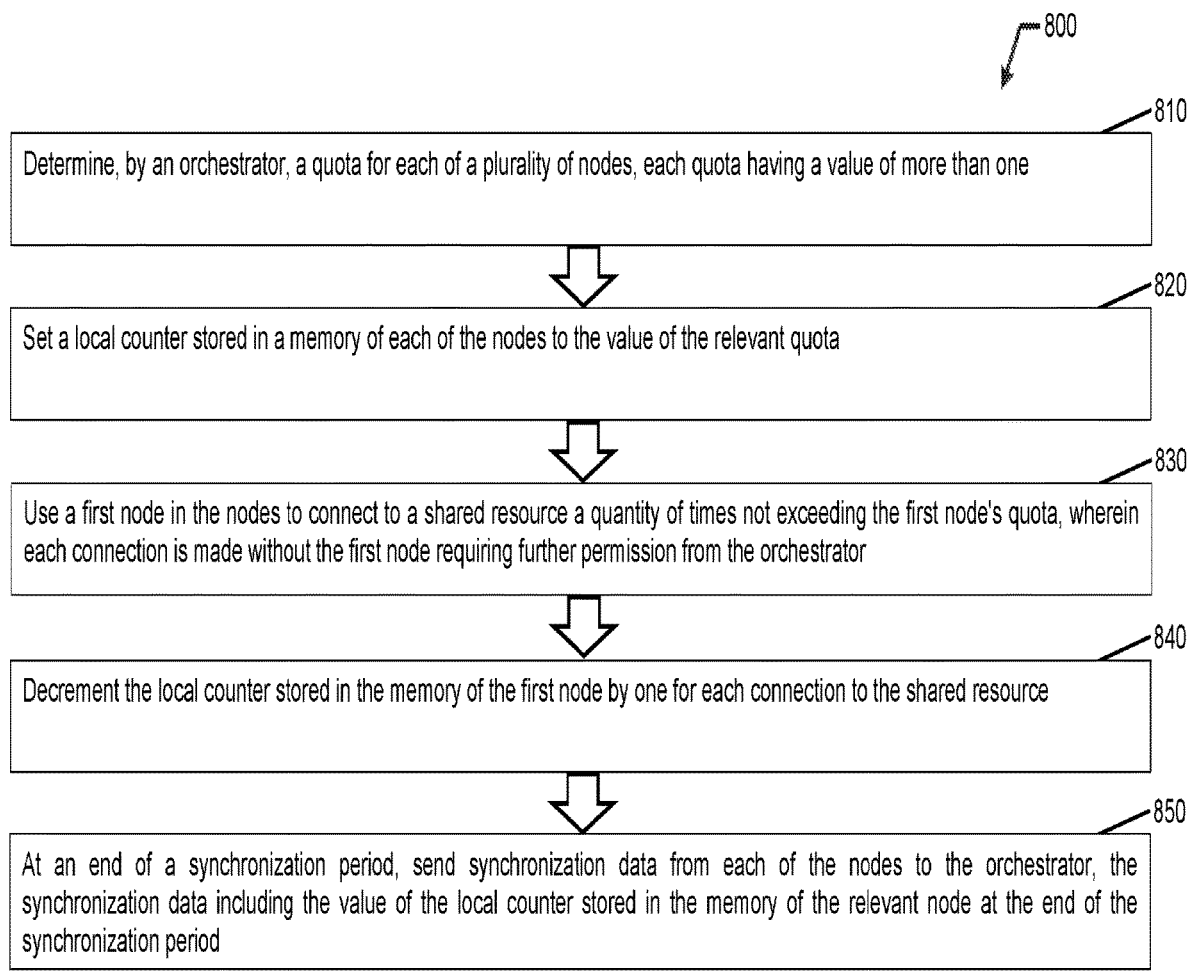
FIG. 8 illustrates a flowchart of an example process for managing access to a shared resource according to an example embodiment of the present disclosure.

FIG. 8 illustrates a flowchart of an example method 800 in accordance with an example embodiment of the present disclosure. Although the example method 800 is described with reference to the flowchart illustrated in FIG. 8, it will be appreciated that many other methods of performing the acts associated with the method 800 may be used. For example, the order of some of the blocks may be changed, certain blocks may be combined with other blocks, and some of the blocks described are optional. The method 800 may be performed by processing logic that may include hardware (circuitry, dedicated logic, etc.), software, or a combination of both.

The example method 800 includes determining, by an orchestrator, a quota for each of a plurality of nodes, each quota having a value of more than one (block 810). For example, the method 800 may include determining, by an orchestrator 650, a quota 665A-C having a value of 10 for each of three nodes 620A-C. The nodes 620A-C each comprise a personal computer executing an application program that may need to use one or more end points of an application program interface (API) hosted on a shared resource 610 that comprises a server. In an example, the API may be provided on the server 610 via 3 scale or other API management system (e.g., MuleSoft, Mashery, Apigee, Layer 7).

The method 800 further includes setting a local counter stored in a memory device of each of the nodes to the value of the relevant quota (block 820). For example, a local counter 670A-C stored in a memory device 630A-C of each of the three personal computers 620A-C may be set to the value of ten in accordance with the relevant quotas 665A-C determined by the orchestrator 650.

The method 800 further includes using a first node in the nodes to connect to the shared resource a quantity of times not exceeding the first node's quota. For example, a first of the three personal computers 620A may connect to the server 610 in order to call an end point of the API hosted on the server 610 a quantity of times not exceeding ten in accordance with the quota 665A determined for the first personal computers 620A.

Each connection is made without the first node requiring further permission from the orchestrator (block 830). For example, each connection between the first personal computer 620A and the server 610 may be made without the first personal computer 620A requiring further permission from orchestrator 650.

The method 800 further includes decrementing the local counter stored in the memory device of the first node by one for each connection to the shared resource (block 840). For example, the local counter 670A stored in the memory device 630A of the first personal computer 620A may be decremented by one after making a connection with the server 610 so that the value of the local counter 670A is then nine. Each of the personal computers 620A-C may then continue to make connections with the server 610, and make further calls to end points of the API hosted on the server 610, until the value of the local counter 670A for the relevant personal computer 620A-C reaches zero.

At an end of a synchronization period, synchronization data is sent from each of the nodes to the orchestrator, including the values of the local counters stored in the memory devices of the nodes at the end of the synchronization period (block 850). For example, at an end of a synchronization period of 10 milliseconds, synchronization data 690 may be sent from the three personal computers 620A-C to the orchestrator 650 that includes the values of the local counters 670A-C stored in the memory devices 630A-C of the personal computers 620A-C at that point in time.

Figure 9:
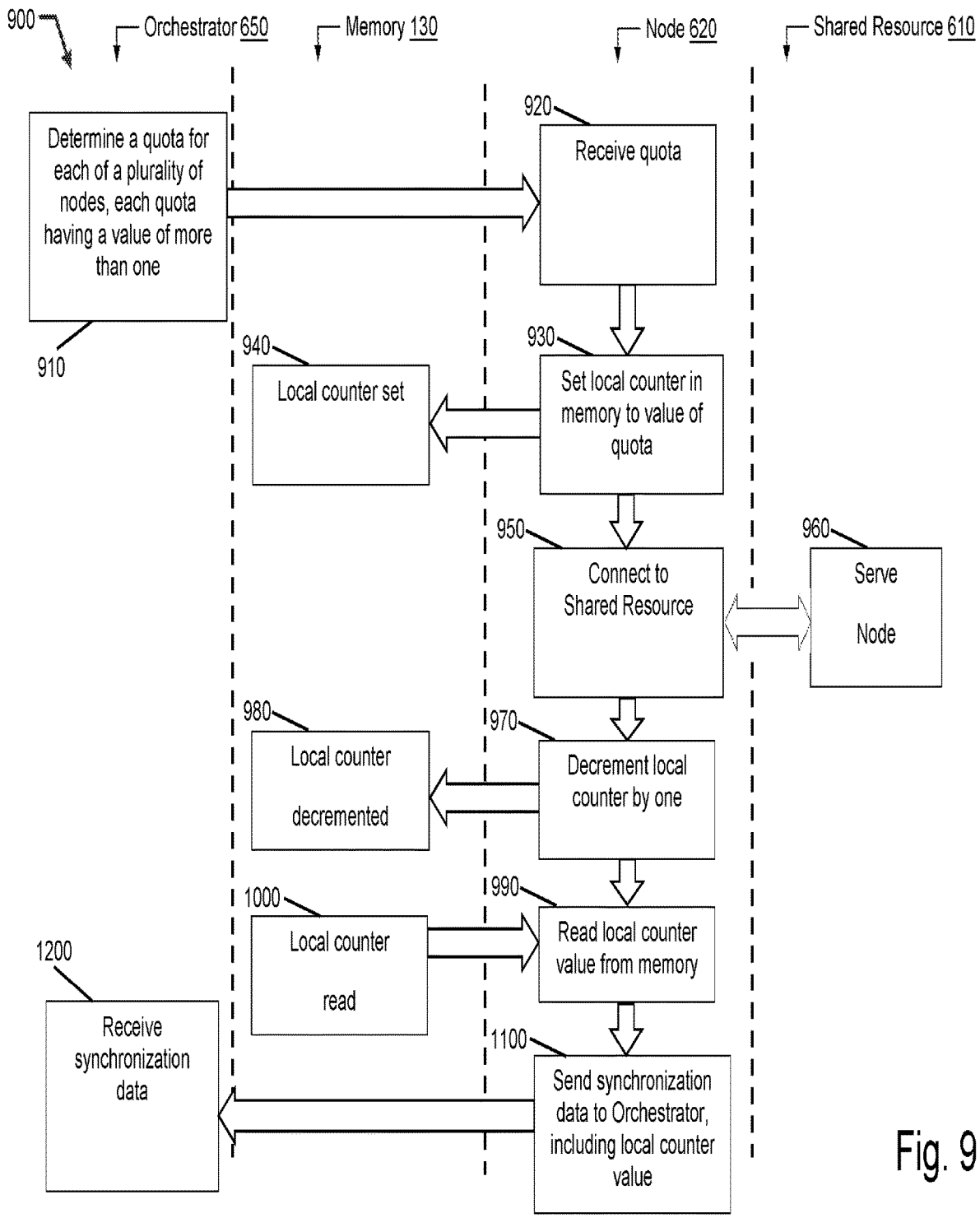
FIG. 9 illustrates a flow diagram of an example process for managing access to a shared resource according to an example embodiment of the present disclosure.

FIG. 9 illustrates a flowchart of an example method 900. Although the example method 900 is described with reference to the flowchart illustrated in FIG. 9, it will be appreciated that many other methods of performing the acts associated with the method 900 may be used. For example, the order of some of the blocks may be changed, certain blocks may be combined with other blocks, and some of the blocks described are optional.

The method 900 includes determining, by an orchestrator 650, a quota 665A-C for each of a plurality of nodes 620A-C, each quota 665A-C having a value of more than one (block 910). In the illustrated example, an individual quota 665A-C is determined by the orchestrator 650 for an individual node 620. The quota 665A-C is received by the node 620 (block 920) and the node 620 sets a local counter 670 stored in a memory device 630 of the node 620 to the value of the quota 665A-C that is received (block 930). The local counter is stored in the memory device 630 (block 940) using a format and/or data structure that allows its value to be efficiently queried and updated. For example, the local counter may be stored as an integer in static or dynamic memory allocated on the memory device 630.

In the example, when the node 620 requires access to a shared resource 610, the node 620 establishes a connection with the shared resource 610 (block 950) and the shared resource 610 serves the node 620 (block 960). For example, the shared resource 610 may be a server hosting an API and the node 620 may need to connect with the server in order to make a call to an API end point. Once the connection has been made, the local counter stored in the memory device 630 is decremented by one (blocks 970 and 980). The node 620 may continue to establish further connections with the shared resource 610 until its local counter reaches zero.

At the end of a synchronization period, the node 620 reads the current value of the local counter from the memory device 630 (blocks 990 and 1000). For example, the node 620 may cause the value of the local counter to be fetched from the memory device 630 and written into a local register of the processor 640 included with the node 620. The node 620 then sends synchronization data 690 to the orchestrator 650, that includes the value of the local counter (block 1100), which is subsequently received by the orchestrator (block 1200). The orchestrator 650 may then use the synchronization data 690 to determine and issue further quotas for the nodes 620A-C.

Figure 10:
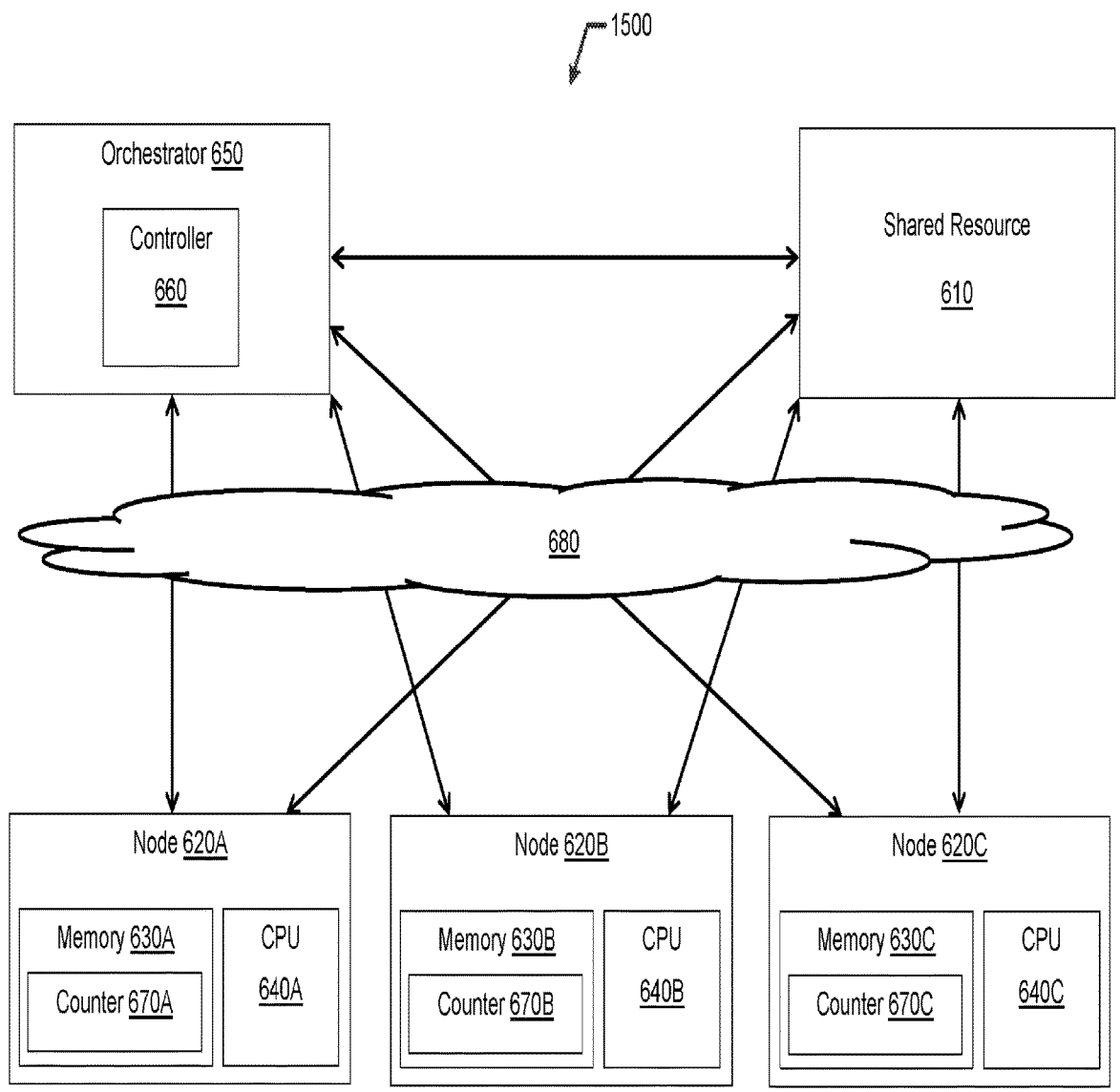
FIG. 10 illustrates a block diagram of an example system for managing access to a shared resource according to an example embodiment of the present disclosure.

An example system 1500 is depicted in FIG. 10 and each of the nodes 620A-C may be in communication with the controller 660 and the shared resource 610 via a computer network 680. The computer network may use a variety of techniques, ranging from a point-to-point processor interconnect, to a system area network, such as an Ethernet-based network.

The systems and methods disclosed herein are inextricably tied to, and provide a significant improvement to, computer resource management technology. For example, by determining a plurality of individual quotas 665A-C for a plurality of nodes 120A-C, and by managing the consumption of these quotas 665A-C on a per-node basis, each individual computing system that needs to use the shared resource 110 (for example, each end device 180A-C) does not have to send an authorization request to the shared resource 110 or other siloed authorization authority. Instead, the authorization request may be evaluated and responded to by one of the nodes 120A-C. Serving and managing authorization requests using a plurality of nodes 180A-C distributes the task of rate limiting and avoids the adverse server load and network latency issues that can arise when a single shared counter is used for rate-limiting purposes. Further, as demand for access to a shared resource 110 increases, additional nodes 180A-C may be provisioned adaptively so that the commensurate increase in authorization requests that inevitably occurs can be adequately served.

The solution described herein is necessarily rooted in computer technology to overcome a problem specifically arising in the realm of computer resource management, and more specifically to rate limiting access to shared resources, by addressing the challenges faced when authorization requests from large numbers of end computing devices need to be received and processed.

The present disclosure provides a particular way to address a problem and improves upon the existing technological processes for rate limiting access to shared resources. The solution enables resource quota allocations to be determined, distributed and managed in an adaptive manner that allows for a performance of hardware utilization not previously performable. The present disclosure may advantageously enable low latency in granting access to a shared resource by avoiding synchronization through the use of the disclosed local counters using the nodes' quotas.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

In an example, a system includes:
a shared resource;
a plurality of nodes, each of the nodes in communication with the shared resource and having a memory and a processor in communication with the memory; and
an orchestrator in communication with the shared resource and the nodes, the orchestrator having a controller configured to determine a quota for each of the nodes, each quota having a value of more than one,
where the processor of each of the nodes is configured to:
set a local counter stored in the memory of the relevant node to the value of the relevant node's quota;
in response to a request received from an end device to use the shared resource, serve the request and decrement the local counter by one;
stop serving requests when a value of the local counter reaches zero; and
at an end of a synchronization period, send synchronization data to the controller, the synchronization data including the value of the local counter at the end of the synchronization period.

The controller may be further configured to:
determine the quota for each of the nodes according to an allocation policy; and
update the allocation policy based on the synchronization data received from each of the nodes.

The controller may be further configured to determine an additional quota for a first node in the nodes when the first node's local counter reaches zero before the end of the synchronization period.

The processor of each of the nodes may be configured to send the synchronization data to the controller after serving an individual request to use the shared resource received from an end device.

The system may further include a server where the controller of the orchestrator is configured to execute on the server.

The shared resource may be coupled to the server.

The shared resource may be an end point of an application program interface hosted on the server.

The controller of the orchestrator may be configured to operate using distributed control logic executing, at least in part, on a plurality of the processors of the nodes.

Each of the nodes may be in communication with the relevant end device via a computer network.

The processors of the nodes may be configured to perform a distributed task with the shared resource.

The shared resource may be an end point of an application program interface hosted on a computing device.

In an example, a method includes: determining, by an orchestrator, a quota for each of a plurality of nodes, each quota having a value of more than one;
setting a local counter stored in a memory of each of the nodes to the value of the relevant quota;
in response to a request to use a shared resource made by an end device:
serving the request with a first node in the nodes, where the local counter stored in the memory of the first node is more than zero; and
decrementing the local counter stored in the memory of the first node by one after serving the request; and
at an end of a synchronization period, sending synchronization data from each of the nodes to the orchestrator, the synchronization data including the value of the local counter stored in the memory of the relevant node at the end of the synchronization period.

The method may further include:
determining, by the orchestrator, the quota for each of the nodes according to an allocation policy; and
updating the allocation policy based on the synchronization data from each of the nodes.

The method may further include determining an additional quota for the first node when the first node's quota reaches zero before the end of the synchronization period.

The first node may send synchronization data to the orchestrator after the first node serves an individual request to use the shared resource made by the end device.

The orchestrator may be executed on a server.

The shared resource may be coupled to the server.

The orchestrator may be executed on the nodes using distributed control logic.

The shared resource may be an end point of an application program interface hosted on a computing device.

The nodes may be used to perform a distributed task with the shared resource.

In an example, a computer-readable non-transitory medium storing executable instructions, which when executed by a computer system, cause the computer system to:

receive from an orchestrator a quota having a value of more than one;

set a local counter stored in a memory of the computer system to the value of the quota;

in response to a request to use a shared resource received from an end device, serve the request and decrement the local counter stored in the memory by one;

stop serving requests when the local counter stored in the memory reaches zero; and at an end of a synchronization period, send synchronization data to the orchestrator, the synchronization data including the value of the local counter stored in the memory at the end of the synchronization period.

In an example, a system includes: a means for determining a quota for each of a plurality of nodes, each quota having a value of more than one;

a means for setting a local counter to set a local counter stored in a memory of each of the nodes to the value of the relevant quota;

a means for serving a request to use a shared resource made by an end device, the request served by a first node in the nodes, where the local counter stored in the memory of the first node is more than zero; and a means for decrementing a local counter to decrement the local counter stored in the memory of the first node by one after serving the request; and a transmission means for sending, at an end of a synchronization period, synchronization data from each of the nodes to the means for determining a quota, the synchronization data including the value of the local counter stored in the memory of the relevant node at the end of the synchronization period.

In an example, a system includes:

a shared resource;

a plurality of nodes, each of the nodes in communication with the shared resource and having a memory and a processor in communication with the memory; and an orchestrator in communication with the shared resource and the nodes, the orchestrator having a controller configured to determine a quota for each of the nodes, each quota having a value of more than one, where the processor of each of the nodes is configured to:
set a local counter stored in the memory of the relevant node to the value of the relevant node's quota;
connect to the shared resource a quantity of times not exceeding the relevant node's quota, where each connection is made without the relevant node requiring further permission from the orchestrator;
decrement the local counter by one for each connection made to the shared resource; and
at an end of a synchronization period, send synchronization data to the controller, the synchronization data including the value of the local counter at the end of the synchronization period.

The controller may be further configured to:

determine the quota for each of the nodes according to an allocation policy; and update the allocation policy based on the synchronization data received from each of the nodes.

The controller may be further configured to determine an additional quota for a first node in the nodes when the first node's local counter reaches zero before the end of the synchronization period.

The processor of each of the nodes may be configured to send synchronization data to the controller after each connection is made to the shared resource.

The system may further include a server where the controller of the orchestrator is configured to execute on the server.

The shared resource may be coupled to the server.

The controller of the orchestrator may be configured to operate using distributed control logic executing, at least in part, on a plurality of the processors of the nodes.

The shared resource may be an end point of an application program interface hosted on a computing device.

In an example, a method includes:

determining, by an orchestrator, a quota for each of a plurality of nodes, each quota having a value of more than one;

setting a local counter stored in a memory of each of the nodes to the value of the relevant quota;

connecting a first node in the nodes to a shared resource a quantity of times not exceeding the first node's quota, where each connection is made without the first node requiring further permission from the orchestrator;

decrementing the local counter stored in the memory of the first node by one for each connection made to the shared resource; and at an end of a synchronization period, sending synchronization data from each of the nodes to the orchestrator, the synchronization data including the value of the local counter stored in the memory of the relevant node at the end of the synchronization period.

The method may further include:

determining, by the orchestrator, the quota for each of the nodes according to an allocation policy; and updating the allocation policy based on the synchronization data from each of the nodes.

The method may further include determining, by the orchestrator, an additional quota for the first node when the first node's quota reaches zero before the end of the synchronization period.

The synchronization data may be sent to the orchestrator after the first node makes an individual connection to the shared resource.

The orchestrator may be executed on a server.

The shared resource may be coupled to the server.

The orchestrator may be executed on the nodes using distributed control logic.

The shared resource may be an end point of an application program interface hosted on a computing device.

In an example, a computer-readable non-transitory medium storing executable instructions, which when executed by a computer system, cause the computer system to:

receive from an orchestrator a quota having a value of more than one;

set a local counter stored in a memory of the computer system to the value of the quota;

connect to a shared resource a quantity of times not exceeding the quota, where each connection is made without the computer system requiring further permission from the orchestrator;

decrement the local counter stored in the memory by one for each connection made to the shared resource; and at an end of a synchronization period, send synchronization data to the orchestrator, the synchronization data including the value of the local counter stored in the memory at the end of the synchronization period.

In an example, a system includes:

a means for determining a quota for each of a plurality of nodes, each quota having a value of more than one;

a means for setting a local counter to set a local counter stored in a memory of each of the nodes to the value of the relevant quota;

a communication means for connecting a first node in the nodes to a shared resource a quantity of times not exceeding the first node's quota, where each connection is made without the first node requiring further permission from the means for determining a quota;

a means for decrementing a local counter to decrement the local counter stored in the memory of the first node by one for each connection made to the shared resource; and a transmission means for sending, at an end of a synchronization period, synchronization data from each of the nodes to the means for determining a quota, the synchronization data including the value of the local counter stored in the memory of the relevant node at the end of the synchronization period.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
   determining, by an orchestrator, a quota for each of a plurality of nodes in view of one or more factors associated with a respective node;
   setting a local counter stored in a memory of each of the nodes to the value of the relevant quota;
   in response to a request to access a resource made by an end device:
      serving the request with a first node in the nodes, wherein the local counter stored in the memory of the first node is more than zero; and
      decrementing the local counter stored in the memory of the first node by one after serving the request; and
   at an end of a synchronization period, sending synchronization data from each of the nodes to the orchestrator, the synchronization data including the value of the local counter stored in the memory of the relevant node at the end of the synchronization period.

2. The method of claim 1, further comprising:
   determining the quota for each of the nodes according to an allocation policy; and
   updating the allocation policy based on the synchronization data received from each of the nodes.

3. The method of claim 1, further comprising determining an additional quota for the first node when the first node's local counter reaches zero before the end of the synchronization period.

4. The method of claim 1, further comprising, by each of the nodes, sending the synchronization data to the orchestrator after serving an individual request to use the resource received from the end device.

5. The method according to claim 1, wherein the orchestrator executes on a server.

6. The method according to claim 5, wherein the resource is coupled to the server.

7. The method according to claim 6, wherein the resource is an end point of an application program interface hosted on the server.

8. The method according to claim 1, further comprising distributed control logic executing, at least in part, on a plurality of the processors of the nodes.

9. The method according to claim 1, wherein each of the nodes is in communication with the relevant end device via a computer network.

10. The method according to claim 1, further comprising performing, by the nodes, a distributed task with the resource.

11. The method according to claim 1, wherein the resource is an end point of an application program interface hosted on a computing device.

12. The method according to claim 1, wherein the one or more factors include at least one of an average consumption of previously issued quotas, a network traffic condition, a network capacity condition, and a load balancing metric.

13. The method according to claim 1, wherein the first node sends a notification to the orchestrator that the local counter stored in the memory of the first node reached zero before the end of the synchronization period.

14. The method according to claim 13, wherein, responsive to receiving the notification at the orchestrator, additional quota is issued to the first node before the end of the synchronization period.

15. The method according to claim 13, wherein the first node stops serving requests when sending the notification.

16. The method according to claim 1, wherein each respective node stops serving requests when a respective local counter reaches zero.

17. The method according to claim 1, wherein the respective values of each of the quotas of the plurality of nodes is determined to be only one.

18. The method according to claim 1, wherein each of the quotas of the plurality of nodes is initially determined to be zero, further comprising each of the plurality of nodes sending an authorization request when receiving an authorization request from an end device.

19. A computer readable medium storing instructions, which when executed by a processor, are configured to cause:
   determining, by an orchestrator, a quota for each of a plurality of nodes in view of one or more factors associated with a respective node;
   setting a local counter stored in a memory of each of the nodes to the value of the relevant quota;
   in response to a request to access a resource made by an end device:
      serving the request with a first node in the nodes, wherein the local counter stored in the memory of the first node is more than zero; and
      decrementing the local counter stored in the memory of the first node by one after serving the request; and
   at an end of a synchronization period, sending synchronization data from each of the nodes to the orchestrator, the synchronization data including the value of the local counter stored in the memory of the relevant node at the end of the synchronization period.

20. A method comprising:

determining, by an orchestrator, a quota for each of a plurality of nodes;

determining, by the orchestrator, a soft limit for each of the plurality of nodes, where a value of the soft limit is higher than a value of the relevant quota;

maintaining a local counter stored in a memory of each of the nodes;

in response to a request to use a resource made by an end device:
- serving the request with a first node in the nodes in accordance with a value of the local counter stored in the first node and in accordance with the soft limit associated with the first node; and
- modifying the local counter stored in the memory of the first node after serving the request; and sending synchronization data from each of the nodes to the orchestrator, the synchronization data including the value of the local counter stored in the memory of the relevant node.

\* \* \* \* \*